US012627521B2

(12) United States Patent
Wang et al.

(10) Patent No.: US 12,627,521 B2
(45) Date of Patent: May 12, 2026

(54) PROCESSING METHOD, NETWORK NODE AND STORAGE MEDIUM

(71) Applicant: ZTE CORPORATION, Shenzhen (CN)

(72) Inventors: Liping Wang, Shenzhen (CN); Tao Qi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 306 days.

(21) Appl. No.: 18/261,522

(22) PCT Filed: Jan. 17, 2022

(86) PCT No.: PCT/CN2022/072319
§ 371 (c)(1),
(2) Date: Jul. 14, 2023

(87) PCT Pub. No.: WO2022/152295
PCT Pub. Date: Jul. 21, 2022

(65) Prior Publication Data
US 2024/0080217 A1 Mar. 7, 2024

(30) Foreign Application Priority Data

Jan. 15, 2021 (CN) .......................... 202110053545.9

(51) Int. Cl.
*H04L 12/18* (2006.01)
*H04W 72/30* (2023.01)
(52) U.S. Cl.
CPC ...... *H04L 12/1877* (2013.01); *H04L 12/1886* (2013.01); *H04W 72/30* (2023.01)

(58) Field of Classification Search
CPC ........... H04L 12/1877; H04L 12/1886; H04W 72/005; H04W 72/30; H04W 4/06; H04W 36/0007; H04W 56/00; H04W 36/0044; H04W 36/023; H04W 76/40; H04W 28/0268
See application file for complete search history.

(56) References Cited

U.S. PATENT DOCUMENTS 11,671,795 B2 * 6/2023 Kim ........................ H04W 4/06
370/329
12,207,080 B2 * 1/2025 Wang .................... H04W 76/12
2017/0303168 A1 10/2017 Koodli et al.
(Continued)

FOREIGN PATENT DOCUMENTS

CN 111935807 A 11/2020
CN 112866929 A 5/2021

OTHER PUBLICATIONS

Extended European Search Report in Application No. 227391703 dated Oct. 22, 2024, 11 pages.
(Continued)

*Primary Examiner* — Mohamed A Kamara
(74) *Attorney, Agent, or Firm* — Morgan, Lewis & Bockius LLP

(57) ABSTRACT

Provided are a processing method, a network node and a storage medium. The processing method is applied to a first network node and includes determining multicast broadcast service (MBS) control information and sending the MBS control information, where the MBS control information instructs a second network node to process an MBS data packet.

20 Claims, 7 Drawing Sheets

Determine a MBS session resource setup request message ⟩ S410

Send the MBS session resource setup request message ⟩ S420

(56) References Cited

U.S. PATENT DOCUMENTS

| | | | |
|---|---|---|---|
| 2021/0258918 A1* | 8/2021 | Hong | H04W 36/0007 |
| 2023/0082017 A1* | 3/2023 | Hong | H04W 76/22 |
| | | | 370/312 |
| 2023/0284244 A1* | 9/2023 | Xu | H04W 72/30 |
| | | | 370/312 |

OTHER PUBLICATIONS

3rd Generation Partnership Project; "Technical Specification Group Services and System Aspects; Study on architectural enhancements for 5G multicast-broadcast services (Release 17)", 3GPP Draft; R3-205925.ZIP 23757-040, 3rd Generation Partnership Project (3GPP), Mobile Competence Centre; 650, Route Des Lucioles; F-06921 Sophia-Antipolis Cedex; France Oct. 14, 2020 (Oct. 14, 2020), XP052398903, Retrieved from the Internet: URL:https://ftp.3gpp.org/tsg_ran/WG3_lu/TS GR3_110-e/Docs/R3-205925.zip 23757-040.zip23757-040_MCCclean.docx.

3rd Generation Partnership Project; "Technical Specification Group Services and System Aspects; Study on architectural enhancements for 5G multicast-broadcast services (Release 17)", 3GPP Standard; Technical Report; 3GPP TR 23.757, 3rd Generation Partnership Project (3GPP), Mobile Competence Centre; 650, Route Des Lucioles; F-06921 Sophia-Antipolis Cedex; France No. V1.2.0, Nov. 28, 2020 (Nov. 28, 2020), pp. 1-293, XP051961714, Retrieved from the Internet: URL:https://ftp.3gpp.org/Specs/archive/23_ series/23.757/23757-120.zip23757-120_MCCclean.docx.

International Search Report in Application No. PCT/CN2022/072319, dated Mar. 28, 2022, 6 pages, including translation.

Huawei, "(TP to TS 38.300 BL CR) Mobility between MBS supporting nodes", 3GPP TSG-RAN WG3 Meeting #110-e, R3-206416, Nov. 13, 2020, pp. 2, 4, 5.

CATT, "Consideration on MBS context management over F1 and E1", 3GPP TSG-RAN WG3 #110 electronic R3-206835, Nov. 12, 2020, section 2.

First Office Action in Korean Application No. 10-2023-7027772, dated Nov. 6, 2025, 13 pages, including translation.

3GPP TS Group Services and Systems Aspects; Study on architectural enhancements for 5G multicast-broadcast services (Release 17), 154 pages.

* cited by examiner

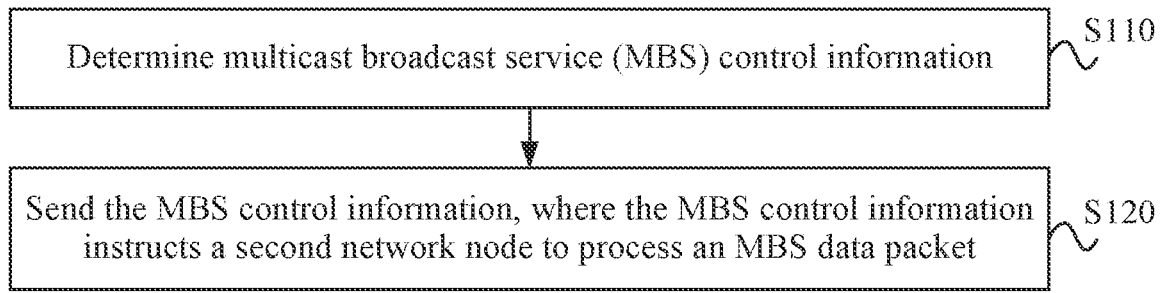

Determine multicast broadcast service (MBS) control information ~ S110

Send the MBS control information, where the MBS control information instructs a second network node to process an MBS data packet ~ S120

FIG. 1

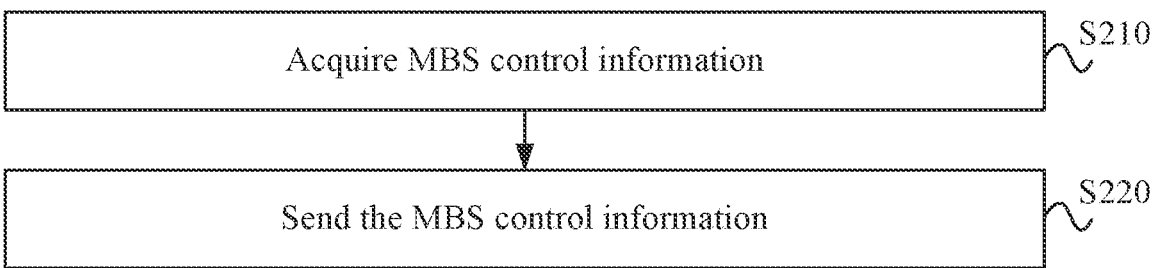

Acquire MBS control information ~ S210

Send the MBS control information ~ S220

FIG. 2

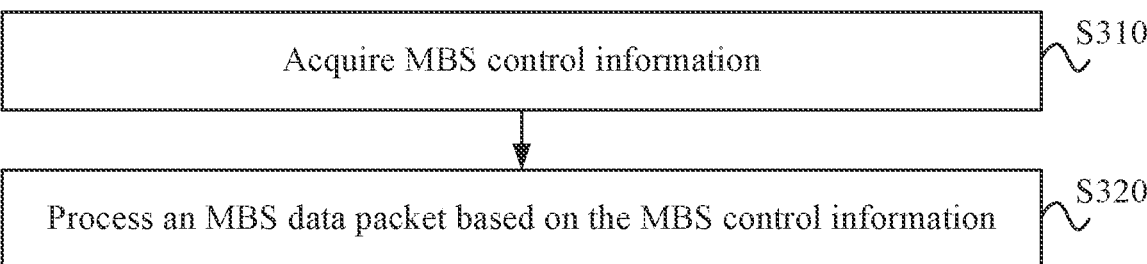

Acquire MBS control information ~ S310

Process an MBS data packet based on the MBS control information ~ S320

FIG. 3

PROCESSING METHOD, NETWORK NODE AND STORAGE MEDIUM

CROSS REFERENCE TO RELATED APPLICATIONS

This is a National Stage Application, filed under 35 U.S.C. 371, based on International Patent Application No. PCT/CN2022/072319, filed on Jan. 17, 2022, which claims priority to Chinese Patent Application No. 202110053545.9 filed with the China National Intellectual Property Administration (CNIPA) on Jan. 15, 2021, the disclosures of which are incorporated herein by reference in their entireties.

TECHNICAL FIELD

The present application relates to the field of communication technology, for example, a processing method, a network node and a storage medium.

BACKGROUND

In the study of multicast broadcast service (MBS) technology, the mobility scenario of a user equipment (UE) is a basic and important scenario. To provide the UE with high-reliability MBS service, it is necessarily required that the UE receives MBS data continuously in the mobility process. For some services, data reception without packet loss is required, that is, lossless data transmission is required. Lossless transmission requires synchronization of sending behaviors on a network side in the mobility process.

Therefore, how to achieve the synchronization of sending behaviors on the network side in the UE mobility scenario is urgent to be solved currently.

SUMMARY

The present application provides a processing method, a network node and a storage medium to effectively achieve the synchronization of sending behaviors on a network side in a UE mobility scenario.

An embodiment of the present application provides a processing method. The method is applied to a first network node and includes the following:

MBS control information is determined.

The MBS control information is sent, where the MBS control information instructs a second network node to process an MBS data packet.

An embodiment of the present application provides a processing method.

MBS control information is acquired.

The MBS control information is sent.

An embodiment of the present application provides a processing method. The method is applied to a second network node and includes the following:

MBS control information is acquired.

An MBS data packet is processed based on the MBS control information.

An embodiment of the present application provides a processing method. The method is applied to a third network node and includes the following:

An MBS session resource setup request message is determined and sent.

An embodiment of the present application provides a network node. The network node includes one or more processors and a storage apparatus.

The storage apparatus is configured to store one or more programs, and when executed by the one or more processors, the one or more programs enable the one or more processors to implement the processing method described above.

An embodiment of the present application provides a storage medium. The storage medium is configured to store a computer program, and the computer program, when executed by a processor, implements any method provided in embodiments of the present application.

The preceding embodiments and other aspects of the present application and implementations thereof are described in more detail in the description of drawings, detailed description, and claims.

BRIEF DESCRIPTION OF DRAWINGS

FIG. 1 is a flowchart of a processing method according to an embodiment of the present application;

FIG. 2 is a flowchart of another processing method according to an embodiment of the present application;

FIG. 3 is a flowchart of another processing method according to an embodiment of the present application;

DETAILED DESCRIPTION

Figure 3A:
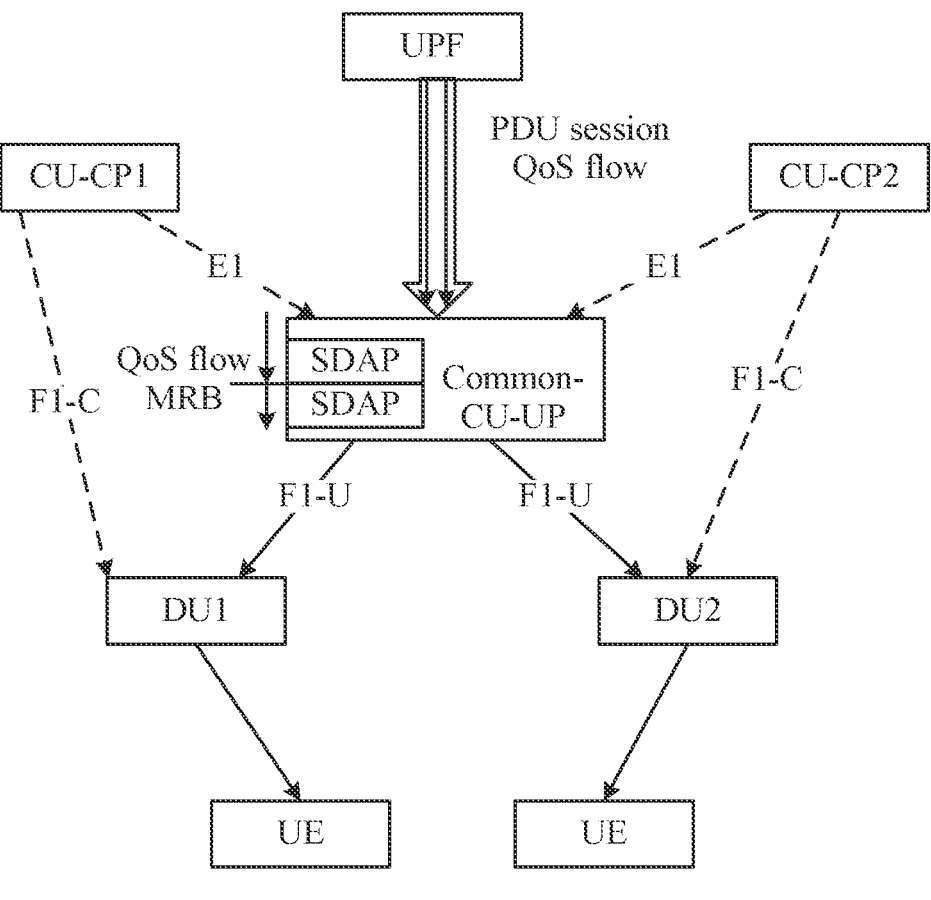
FIG. 3A is an architecture diagram of a common centralized unit (CU)-control plane (CP) according to an embodiment of the present application.

Embodiments of the present application are described hereinafter in detail in conjunction with drawings. It is to be noted that if not in collision, the embodiments and features therein in the present application may be combined with each other.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from those described herein.

In a new radio (NR) access technology system, one next-generation node B (gNB) is composed of two parts: a centralized unit (CU) and a distributed unit (DU). The CU may further be divided into two parts: a CU-CP and a CU-user plane (CU-UP). The CU-CP is responsible for the control function, and the CU-UP is responsible for the data processing execution function. The CU and the DU are connected via an F1 interface (for example, the CU-CP and the DU are connected via F1-C mainly for controlling information exchange, and the CU-UP and the DU are connected via F1-U mainly for user plane data transmission). A UE is connected to a network via a Uu air interface. The CU-CP is connected to the CU-UP via an E1 interface, and the CU-CP sends a data processing rule (the processing includes data quality of service (QoS) flow-to-radio bearer mapping, data packet numbering and encryption, etc.) to the CU-UP via the E1 interface. The CU-UP processes a data packet according to an indication of the CU-CP. For an NR MBS, a bearer associated with a certain MBS session is referred to as an MBS radio bearer herein (MRB for short in the following).

In an example implementation, FIG. 1 is a flowchart of a processing method according to an embodiment of the present application. The method may be applicable to a case of achieving the sending behaviors on a network side in a UE mobility scenario, such as the synchronization of MBS control information to process an MBS data packet based on the MBS control information, thereby achieving the synchronization of sending behaviors on the network side. The method may be performed by a processing apparatus provided in the present application. The processing apparatus may be implemented by software and/or hardware and may be integrated into a first network node. The first network node may be an anchor CU-CP. The anchor CU-CP may generate MBS control information for a second network to process an MBS data packet, thereby achieving data synchronization on the network side.

As shown in FIG. 1, the present application provides a processing method including S110 and S120.

In S110, MBS control information is determined.

The MBS control information may be control information required for processing an MBS data packet. The manner of determining the MBS control information is not limited in the present embodiment. For example, the operation that the MBS control information is determined includes but is not limited to the following: The first network node directly generates the MBS control information; a second MBS session resource setup request message sent by a fourth network node is acquired, and then the MBS control information is generated; and the MBS control information transmitted by a third network node is acquired, where the carrier for the third network node to transmit the MBS control information is not limited.

The MBS control information includes one or more of the following: an MBS session identity, the MBS session downlink aggregation maximum bit rate, next-generation (NG) uplink user plane transport layer information, or MRB list information required for each MBS session and established by a second network node. Each piece of MRB list information includes one or more of the following: an MRB identity, a service data adaptation protocol (SDAP) configuration, a packet data convergence protocol (PDCP) configuration, QoS parameter information, a QoS flow list included in an MRB, a QoS flow identity included in an MRB, or QoS parameter information of a QoS flow level included in an MRB.

In S120, the MBS control information is sent, where the MBS control information instructs the second network node to process an MBS data packet.

After the MBS control information is determined, the first network node may send the MBS control information to the second network node for the second network node to process an MBS data packet. The MBS data packet may be a data packet required by a UE having MBS service requirements within the area of the second network node. The area may be formed by CU-CPs having an Xn connection.

According to the processing method provided in the present application, the second network node is instructed to process the MBS data packet based on the determined MBS control information, and the second network node may process the MBS data packet based on the MBS control information, thereby achieving data synchronization on the network side.

Based on the preceding embodiment, variant embodiments of the preceding embodiment are provided. It is to be noted here that for ease of description, only differences from the preceding embodiments are described in the variant embodiments.

In an embodiment, the operation that the MBS control information is determined includes the following:

A first MBS session resource setup request message sent by the third network node is acquired, where the first MBS session resource setup request message includes node identity information of the first network node or area information of the first network node.

The MBS control information is directly generated according to the first MBS session resource setup request message.

The area information includes one network node, a cell list, or one area code, and the area code corresponds to one network node list or one cell list.

The first MBS session resource setup request message may be used for indicating an anchor CU-CP. When the first network node determines that node identity information included in the first MBS session resource setup request message is the identity information of the current network node, the first network node may directly generate the MBS control information. In the present embodiment, the anchor-CU-CP is designated by the third network node.

In an embodiment, the processing method further includes the following:

An MBS session resource information request sent by the fourth network node is acquired, where the MBS session resource information request includes an MBS session identity or MBS session information.

An MBS session resource information response message is sent to the fourth network node, where the MBS session resource information response message includes the MBS control information.

The MBS session information includes one or more of an MBS session identity or session resource setup information, and the session resource setup information includes uplink NG user plane transport network information, a session type, a QoS flow identity, or a QoS parameter of a QoS flow level.

In the present embodiment, the first network node may be a CU-CP which is the first having MBS service requirements, and the first network node directly generates the MBS control information. In a case where the fourth network node has the MBS service requirements, the fourth network node may send an MBS session resource information request to the first network node so as to request the MBS control information.

The MBS session resource information response message is a response message from the first network node to respond to the MBS session resource information request.

In an embodiment, the operation that the MBS control information is determined includes the following:

A second MBS session resource setup request message sent by the fourth network node is acquired.

The MBS control information is generated according to the second MBS session resource setup request message.

The second MBS session resource setup request message is a message sent by the first network node having an MBS service request for requesting the MBS control information, and the second MBS session resource setup request message includes an MBS session identity or MBS session information.

In a case where the first network node is not the first CU-CP having MBS service requirements, the first CU-CP having MBS service requirements may send a second MBS session resource setup request message to the first network node to request the first network node to generate and feed back the MBS control information.

In an embodiment, the processing method further includes the following:

An MBS session resource setup response message is fed back to the fourth network node, where the MBS session resource setup response message includes the MBS control information.

After the first network node generates the MBS control information, the MBS control information may be carried in the MBS session resource setup response message and sent to the fourth network node.

In an embodiment, the operation that the MBS control information is determined includes the following:

The MBS control information is directly generated.

In the embodiment, the anchor-CU-CP may not be designated by the third network node but is autonomously determined. If the first CU-CP having MBS service requirements is determined as the anchor-CU-CP, the anchor-CU-CP may directly generate the MBS control information.

In an embodiment, the processing method further includes the following:

A first MBS session established notification message is sent to the fourth network node, where the first MBS session established notification message includes the MBS control information.

After the anchor-CU-CP determines the MBS control information, the first MBS session established notification message may be directly sent to the fourth network node. The first MBS session established notification message may be used for indicating the MBS control information.

It is to be noted that the number of fourth network nodes in the present application may be at least one.

In an embodiment, the processing method further includes the following:

First MBS session established query information sent by the fourth network node is acquired, and the first MBS session established query information includes an MBS session identity.

A first MBS session established notification response message is sent to the fourth network node, and the first MBS session established notification response message includes the MBS control information.

In the embodiment, the anchor-CU-CP is autonomously negotiated, and a non-anchor-CU-CP does not know the anchor-CU-CP. Therefore, when the fourth network node, that is, the non-anchor-CU-CP, has the MBS service requirements, the first MBS session established query information may be sent. The first MBS session established query information may be used for querying the MBS control information.

It is to be noted that "first", "second", and the like in the present application are only used for distinguishing the corresponding content. For example, the first MBS session established query information and the second MBS session established query information are only used for distinguishing the MBS session established query information. The first MBS session established query information and the second MBS session established query information may include the same content, and for example, both include an MBS session identity. The first MBS session established query information may be regarded as MBS session established query information sent by a non-anchor CU-CP to the first network node. The second MBS session established query information may be regarded as MBS session established query information sent by a non-anchor-CU-CP to another non-anchor-CU-CP. When the non-anchor-CU-CP requests the MBS control information, the non-anchor-CU-CP may acquire the MBS control information from another non-anchor-CU-CP having the MBS control information or from the anchor-CU-CP.

In an embodiment, the operation that the MBS control information is determined includes one of the following:

A third MBS session resource setup request message sent by the third network node is acquired, where the third MBS session resource setup request message includes the MBS control information.

A fourth MBS session resource setup request message sent by the third network node is acquired, and the MBS control information is generated according to the fourth MBS session resource setup request information. The fourth MBS session resource setup request message includes MBS session information and template information of the MBS control information, the template information includes setup rule list information about QoS flow list identity-to-MRB identity mapping, each set of setup rules includes one or more of the following: an MRB identity, an SDAP configuration, or a PDCP configuration, the SDAP configuration includes one or more of the following: an SDAP header, a default MRB, or a mapped QoS flow list, and the PDCP configuration includes one or more of the following: a PDCP sequence number (SN) length, an out-of-order delivery indication, or a discard timer.

In an embodiment, the MBS control information may be generated by the third network node. The first network node directly acquires the MBS control information included in a third MBS session resource setup request message. In the present embodiment, the third network node may be a core network or background network management.

The third network node sends the fourth MBS session resource setup request message to the first network node, and the first network node matches a matching MRB template based on the fourth MBS session resource setup request message to configure and generate the MBS control information.

In an embodiment, the processing method further includes the following:

An MBS session resource change message is acquired, where the MBS session resource change message includes node identity information of a new first network node.

In an example, the access and mobility management function (AMF) notifies multiple CU-CPs of a new anchor-CU-CP identity (ID) over an NG-C interface through the MBS session resource change message.

In an embodiment, the processing method further includes the following:

Changed MBS control information is sent.

In an example, only the anchor-CU-CP can change the MBS control information. After changing the MBS control information, the anchor-CU-CP sends the new setup to the second network node (that is, the CU-UP) and to the fourth network node (that is, other CU-CPs) via the E1 interface.

In an embodiment, the processing method further includes the following:

Anchor change information is transmitted, and the anchor change information includes node identity information of a new first network node.

In the present embodiment, the next first network node is designated by the first network node, that is, the next anchor-CU-CP is designated by the original anchor-CU-CP. The transmitted anchor change information is indication information for designating the next first network node. In an embodiment, the processing method further includes the following:

Changed MBS control information is acquired.

In an example, any CU-CP initiates an MBS control information change request to the common-CU-UP, and the Common-CU-UP receives the new setup and sends the new setup to other CU-CPs.

In an example, the core network may autonomously change the MBS control information and notify all CU-CPs and the common-CU-UP of the changed MBS control information.

In an embodiment, the processing method further includes the following:

Release information is sent to the second network node.

In an example, when the original anchor-CU-CP leaves, a release indication (that is, the release information) is sent to the common-CU-UP. The common-CU-UP decides a next anchor-CU-CP and indicates the next anchor-CU-CP to be the anchor-CU-CP via E1. Only the anchor-CU-CP can change the MBS control information. Only the anchor-CU-CP can send the new setup to the CU-UP and other CU-CPs via the E1 interface after the MBS control information is changed.

The release information may be regarded as information about releasing the anchor.

In an embodiment, the processing method further includes the following:

Change request information is sent to the second network node, and the change request information requests for changing the MBS control information.

In an example, any CU-CP initiates an MBS control information change request to the common-CU-UP, and the common-CU-UP receives the new setup and sends the new setup to other CU-CPs. After the first network node changes the MBS control information, the first network node may send change request information to the second network node, and the change request information may include the changed MBS control information.

In an embodiment, the MBS control information includes one or more of the following: an MBS session identity, the MBS session downlink aggregation maximum bit rate, NG uplink user plane transport layer information, or MRB list information required for each MBS session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB.

In an example implementation, the present application further provides a processing method. FIG. 2 is a flowchart of another processing method according to an embodiment of the present application. The method may be applicable to a case of achieving the synchronization of sending behaviors on a network side in a UE mobility scenario. The method may be performed by a processing apparatus provided in the present application. The processing apparatus may be implemented by software and/or hardware and may be integrated into a fourth network node. The fourth network node may be a non-anchor-CU-CP. The number of fourth network nodes is at least one, and the fourth network node and the first network node may have an Xn connection. For the content that is not yet exhaustive in the embodiment, reference may be made to the preceding embodiments, and the details are not repeated here. For the content that is not yet exhaustive in the embodiment, reference may be made to the preceding embodiments, and the details are not repeated here.

As shown in FIG. 2, the processing method provided in the present application includes S210 and S220.

In S210, MBS control information is acquired.

The manner of acquiring the MBS control information is not limited in the present embodiment, as long as it is ensured that the MBS control information acquired by the fourth network node is the same as the MBS control information acquired by the first network node.

For example, the fourth network node may acquire the MBS control information from the first network node or may acquire the MBS control information from a third network node. When the fourth network node acquires the MBS control information from the first network node, the fourth network node may directly receive the MBS control information broadcast by the first network node or may request the MBS control information from the first network node.

In S220, the MBS control information is sent.

After the MBS control information is acquired, in a case of having MBS service requirements, the fourth network node may send the MBS control information to a second network node for the second network node to process an MBS data packet.

In the processing method provided in the embodiment, the MBS control information is acquired and sent for the second network node to process an MBS data packet, thereby achieving the synchronization of sending behaviors on the network side.

Based on the preceding embodiments, variant embodiments of the preceding embodiments are provided. It is to be noted here that for ease of description, only differences from the preceding embodiments are described in the variant embodiments.

In an embodiment, the operation that the MBS control information is acquired includes the following:

A first MBS session resource setup request message sent by the third network node is acquired.

An MBS session resource information request is sent to the first network node.

An MBS session resource information response message sent by the first network node is acquired.

In the embodiment, an anchor-CU-CP may be designated by the first MBS session resource setup request message sent by the third network node, and the first network node is the first CU-CP having MBS service requirements. In a case where the fourth network node has the MBS service requirements, an MBS session resource information request is sent to a network node (that is, the first network node) indicated by a node identity of the first network node included in the first MBS session resource setup request message, and the MBS session resource information request may request the MBS control information from the first network node. The MBS session resource information response message is response information of the MBS session resource information request and includes the MBS control information.

In an embodiment, the operation that the MBS control information is acquired includes the following:

A first MBS session resource setup request message sent by the third network node is acquired.

A second MBS session resource setup request message is sent to the first network node.

An MBS session resource setup response message fed back by the first network node is acquired.

In the embodiment, the anchor-CU-CP may be designated by the first MBS session resource setup request message sent by the third network node, the first network node is not the first CU-CP having MBS service requirements, and the fourth network node is the first CU-CP having MBS service requirements. The second MBS session resource setup request message is used for requesting the first network node to generate the MBS control information. The second MBS session resource setup request message may further request the first network node to feed back the MBS control information. The MBS session resource setup response message includes the MBS control information.

It is to be noted that the means of determining whether a network node is the first CU-CP having MBS service requirements is not limited, and the first CU-CP having MBS service requirements may be indicated by the core network or may be determined by determining whether the MBS control information broadcast by other CU-CPs is received.

In an embodiment, the operation that the MBS control information is acquired includes the following:

A first MBS session established notification message sent by the first network node is acquired.

In a case where the first network node is the first CU-CP having MBS service requirements, the fourth network node may receive the first MBS session established notification message broadcast by the first network node, and the first MBS session established notification message includes the MBS control information.

In an embodiment, the operation that the MBS control information is acquired includes the following:

First MBS session established query information is sent.

A first MBS session established notification response message is acquired.

In an embodiment, the operation that the MBS control information is acquired includes the following:

Second MBS session established query information is sent.

A second MBS session established notification response message is acquired, where the second MBS session established notification response message is sent by another non-anchor network node and indicates whether the MBS control information exists.

In a case where the second MBS session established notification response message indicates that the MBS control information exists, the first MBS session established notification response message includes the MBS control information, and in a case where the second MBS session established notification response message indicates that the MBS control information does not exist, it is continued to send the second MBS session established query information.

In an embodiment, the processing method further includes the following:

MBS session established query information sent by another non-anchor network node is acquired.

A third MBS session established notification response message is fed back, where the third MBS session established notification response message indicates whether the MBS control information exists in the current network node.

In the present embodiment, the first network node is autonomously negotiated, and the fourth network node does not know which network node is the first network node. Therefore, the fourth network node may request the MBS control information by sending the MBS session established query information. The MBS session established query information may be information for querying the MBS control information. The first MBS session established query information may be information sent to the first network node, and the second MBS session established query information may be information sent to other fourth network nodes.

The fourth network node queries the MBS control information by sending the MBS session established query information. If the MBS session established notification response message indicates that the MBS control information does not exist, the fourth network node continues to send the MBS session established query information to a next network node. The MBS session established notification response message is a response message to the MBS session established query information. When the MBS session established notification response message indicates that the MBS control information exists, the MBS session established notification response message may include the MBS control information.

In an embodiment, the operation that the MBS control information is acquired includes the following:

A third MBS session resource setup request message sent by the third network node is acquired.

In the embodiment, the MBS control information may be determined by the third network node and transmitted to the fourth network node.

In an embodiment, the operation that the MBS control information is acquired includes the following:

MBS session established request information is sent to the second network node, where the MBS session established request information includes an MBS session identity.

An MBS session established response information sent by the second network node is acquired, where the MBS session established response information includes the MBS control information.

If the fourth network node has the MBS service requirements, the fourth network node may send the MBS session established request information to the second network node to request the MBS control information.

In an embodiment, the processing method further includes the following:

Change request information is sent to the second network node.

The change request information may request to change the MBS control information. If the fourth network node wants to change the MBS control information, the fourth network node may send the change request information to the second network node.

In an embodiment, the processing method further includes the following:

Changed MBS control information is acquired.

The fourth network node may acquire the changed MBS control information from the third network node or the second network node.

In an example implementation, the present application provides a processing method. FIG. 3 is a flowchart of yet another processing method according to an embodiment of the present application. The method may be applicable to a case of achieving the synchronization of sending behaviors on a network side in a UE mobility scenario. The present application may be performed by a processing apparatus provided in the present application. The processing apparatus may be implemented by software and/or hardware and may be integrated into a second network node, and the second network node may be a CU-UP. For the content that is not yet exhaustive in the embodiment, reference may be made to the preceding embodiments, and the details are not repeated here.

As shown in FIG. 3, the processing method provided in the present application includes S310 and S320.

In S310, MBS control information is acquired.

The second network node acquires the MBS control information for processing an MBS data packet. In S310, the second network node may acquire the MBS control information from a third network node or a first network node, alternatively, the second network node may acquire changed MBS control information from a fourth network node.

In S320, an MBS data packet is processed based on the MBS control information.

After the MBS control information is acquired, the second network node may process an MBS data packet within an area based on the MBS control information.

In the processing method provided in the embodiments, an MBS data packet is processed based on the acquired MBS control information so that the unification of the MBS control information is ensured, thereby achieving the synchronization of sending behaviors on the network side.

Based on the preceding embodiments, variant embodiments of the preceding embodiments are provided. It is to be noted here that for ease of description, only differences from the preceding embodiments are described in the variant embodiments.

In an embodiment, the processing method further includes the following:

MBS session established request information sent by the fourth network node is acquired.

MBS session established response information is sent to the fourth network node.

In an embodiment, the processing method further includes the following:

Release information sent by the first network node is acquired.

Node identity information of a new first network node is determined and transmitted.

In an embodiment, the processing method further includes the following:

Changed MBS control information is acquired.

The changed MBS control information may be sent by the first network node, or the fourth network node, or the third network node, which is not limited here.

In an embodiment, the processing method further includes the following:

Change request information is acquired.

Changed MBS control information is transmitted.

The change request information may be sent by the first network node or the fourth network node.

Figure 4:
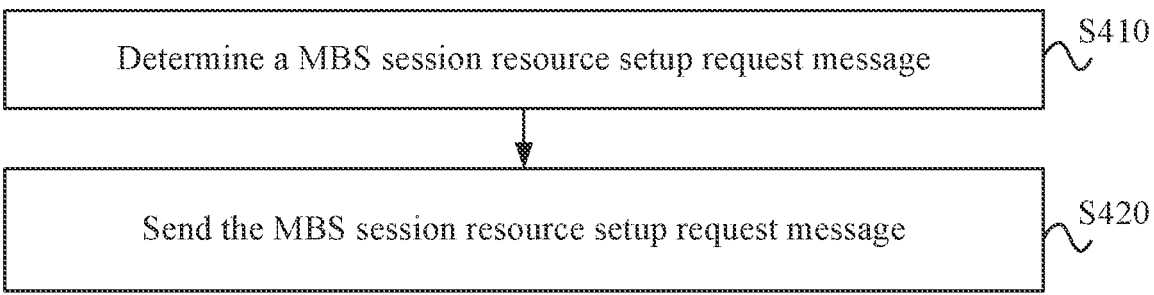
FIG. 4 is a flowchart of another processing method according to an embodiment of the present application.

In an example implementation, the present application provides a processing method. FIG. 4 is a flowchart of still yet another processing method according to an embodiment of the present application. The method may be applicable to a case of achieving the synchronization of sending behaviors on a network side in a UE mobility scenario. The method may be integrated into a processing apparatus. The processing apparatus may be implemented by software and/or hardware and may be integrated into a third network node, and the third network node may be the core network. For the content that is not yet exhaustive in the embodiment, reference may be made to the preceding embodiments, and the details are not repeated here.

As shown in FIG. 4, the processing method provided in the present application includes S410 and S420.

In S410, an MBS session resource setup request message is determined.

The MBS session resource setup request message may include a node identity of a first network node or may directly include MBS control information.

In S420, the MBS session resource setup request message is sent.

The third network node may send the MBS session resource setup request message to at least one of a first network node, a second network node or a fourth network node.

According to the processing method provided in the present application, the MBS session resource setup request message is determined and sent for the first network node to determine the MBS control information so that the second network node can process an MBS data packet based on the determined MBS control information, thereby achieving the synchronization of sending behaviors on the network side in the UE mobility scenario.

Based on the preceding embodiments, variant embodiments of the preceding embodiments are provided. It is to be noted here that for ease of description, only differences from the preceding embodiments are described in the variant embodiments.

In an embodiment, the MBS session resource setup request message includes a first MBS session resource setup request message or a third MBS session resource setup request message.

In an embodiment, the processing method further includes the following:

An MBS session resource change message is determined and transmitted.

In the present embodiment, the anchor change may be designated by the third network node. The MBS session resource change message indicates a new anchor-CU-CP through the node identity information of a new first network node contained in the MBS session resource change message.

In an embodiment, the processing method further includes the following:

Changed MBS control information is determined and transmitted.

The third network node may autonomously change the MBS control information and send the changed MBS control information to the first network node and the fourth network node, and the first network node and the fourth node may communicate with the second network node based on the updated MBS control information.

The exemplary description of the processing method provided in the present application will be given below. In the study of 5G multicast/broadcast, and 5G MBS or NR MBS (which is referred to as MBS technology), the present application proposes schemes for the synchronization on the network side in the UE mobility such as a handover process.

At present, Release 17 NR MBS in 3GPP is under intense research and discussion. The NR MBS supports a UE to receive broadcast services in groups, and in such a manner, the overhead on the network side can be saved.

To support the continuity of the MBS data reception of the UE in the mobility process, one scheme is that a source node and a target node need to maintain the identical PDCP layer data packet number, that is, synchronization of the PDCP SN. Based on this, since multiple radio access network (RAN) nodes number data packets in the CU-UP, it may be considered to share a CU-CP, that is the common-CU-UP scheme, namely, a source RAN node and a target RAN node share the same CU-UP. FIG. 3A is an architecture diagram of a common CU-CP according to an embodiment of the present application. As shown in FIG. 3A, a data packet from a user plane function (UPF) of a data processing unit of the core network arrives at a common-CU-UP, and the common-CU-UP processes the data packet according to data packet processing configuration information such as MBS control information (including processing rules such as a data QoS flow-to-MRB mapping rule in the SDAP layer, encryption and data packet numbering of the PDCP layer) indicated by the CU-CP via an E1 interface. The common-CU-UP then delivers the data packet to DUs of different RAN nodes via an F1-U, and the DUs send the processed MBS data to the respective served UEs. In FIG. 3A, two CU-CPs (that is, CU-CP1 and CU-CP2) and two DUs (that is, DU1 and DU2) are illustrated as an example.

In the common-CU-UP scheme, multiple RAN nodes share one CU-UP for a certain MBS service. If each RAN node independently performs separate resource allocation and scheduling for this MBS service, the manner in which each CU-CP processes the configuration information of the MBS data may be different. In the common-CU-UP architecture, since only one common-CU-UP exists, it means that for a certain MBS service, the configuration of the common-CU-UP for processing the MBS service data must be consistent among multiple different CU-CPs. Therefore, it is necessary to consider how to uniquely determine the manner in which the common-CU-UP processes the broadcast/multicast service data, that is, the MBS data configuration information, namely the MBS control information. A specific manner is to have a unique anchor-CU-CP, that is, the anchor-CU-CP generates the MBS data processing setup information (that is, the MBS control information) of the common-CU-UP, as shown in the schemes of embodiment one and embodiment two. For example, the MBS data processing setup information may also be configured by the background or the core network, as shown in the scheme of embodiment three. The analysis and description of the schemes in the three embodiments are given below.

Embodiment One: Scheme Based on a Core Network-Designated Anchor-CU-CP

In this scheme, one anchor-CU-CP exists, and the anchor-CU-CP is designated by the core network. The function of this anchor-CU-CP is that the anchor-CU-CP as an anchor generates unique MBS control information, and subsequently, the generated MBS control information becomes the MBS data processing setup information and then is sent to the common-CU-UP via an E1 interface.

Figure 3B:
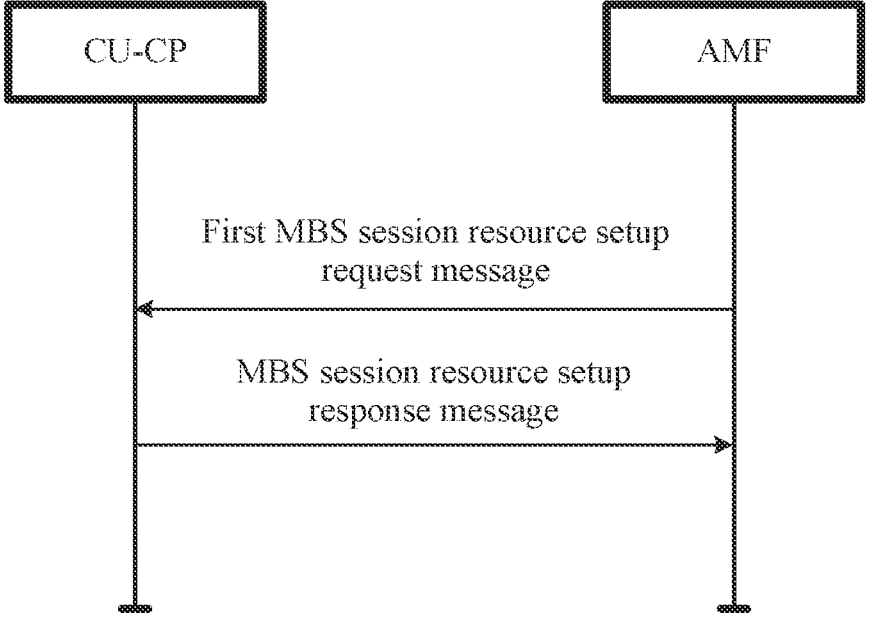
FIG. 3B is a schematic diagram of an MBS session resource setup process according to an embodiment of the present application.

First, how the core network determines the anchor-CU-CP needs to be considered. FIG. 3B is a schematic diagram of an MBS session resource setup process according to an embodiment of the present application. With reference to FIG. 3B, the manner in which the core network determines the anchor-CU-CP may be manner one. In manner one, the CU-CP of the RAN node (the RAN node in which the control plane is located) to which the first UE having MBS multicast service requirements belongs is the anchor-CU-CP. When the AMF of the core network initiates a first MBS session resource setup request message, that is, an MBS session resource setup request, to the CU-CP, the CU-CP may be designated as the anchor-CU-CP. After the CU-CP serving as the anchor-CU-CP receives the first MBS session resource setup request message, the CU-CP may feed back an MBS session resource setup response message to the AMF.

When a UE under another CU-CP has the same MBS service requirements, the AMF of the core network initiates an MBS session resource setup request message, that is, an MBS session resource setup request message, to the CU-CP, and may indicate an anchor-CU-CP ID (that is, the gNB ID) to the CU-CP. The MBS session resource setup request message may further include, for example, area information of the common-CU-UP. The area information may be one gNB, a cell list or one area code, and the area code may be understood as one gNB list or a cell list.

For example, the manner in which the core network determines the anchor-CU-CP may be manner two. In manner two, the core network designates a certain CU-CP as the anchor-CU-CP according to its own judgment. When a UE under any CU-CP has the same MBS service requirements, the AMF of the core network initiates an MBS session resource setup request to the CU-CP and may indicate an anchor-CU-CP ID (that is, the gNB ID) to the CU-CP. The MBS session resource setup request message may further include, for example, area information of the common-CU-UP. The area information may be one gNB, a cell list or one area code, and the area code may be understood as one gNB list or a cell list.

After the anchor-CU-CP is determined, how other CU-CPs acquire the MBS data processing setup information is described below.

(1) If the anchor-CU-CP is the first CU-CP having an MBS service request, the anchor-CU-CP directly generates the MBS data processing setup information and sends the MBS data processing setup information to the common-CU-UP. The MBS data processing setup information may include one or more of the following: an MBS session identity, the MBS session downlink aggregation maximum bit rate, NG uplink user plane transport layer information, or MRB list information required for each MBS session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB.

Figure 3C:
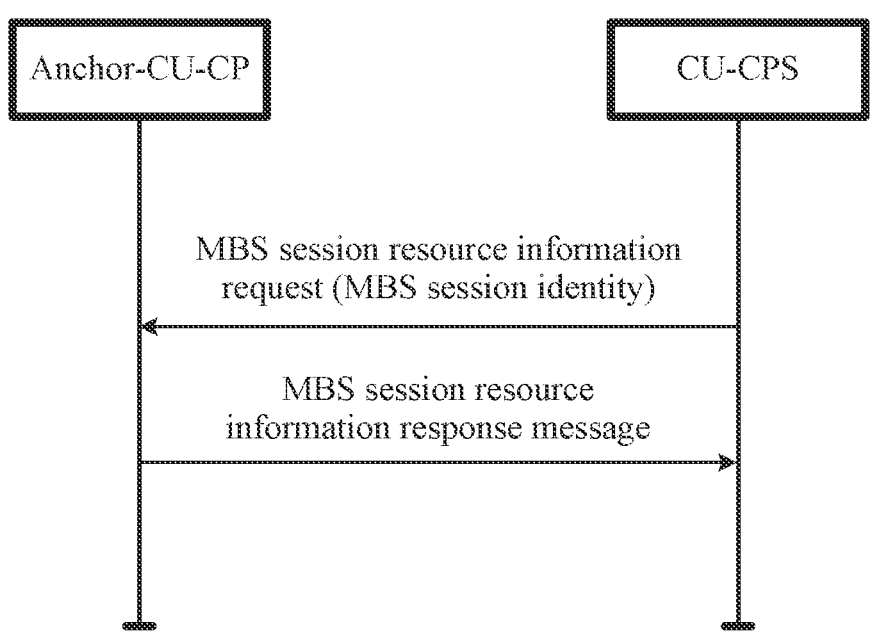
FIG. 3C is a schematic diagram of an MBS session resource information request process according to an embodiment of the present application.

FIG. 3C is a schematic diagram of an MBS session resource information request process according to an embodiment of the present application. As shown in FIG. 3C, other CU-CPs send an MBS session resource information request to the corresponding anchor-CU-CP via an Xn interface based on the anchor-CU-CP ID information indicated by the core network to apply for the MBS data processing setup information of the designated MBS service from the corresponding anchor-CU-CP. After the anchor-CU-CP receives a request indication, the anchor-CU-CP carries the generated MBS data processing setup information in an MBS session resource information response message and sends the MBS session resource information response message to the requesting CU-CPs via an Xn interface. The applying message, that is, the MBS session resource information request, needs to carry an MBS session ID, and the response message, that is, the MBS session resource information response message, needs to carry the MBS session ID and the MBS data processing setup information.

Figure 3D:
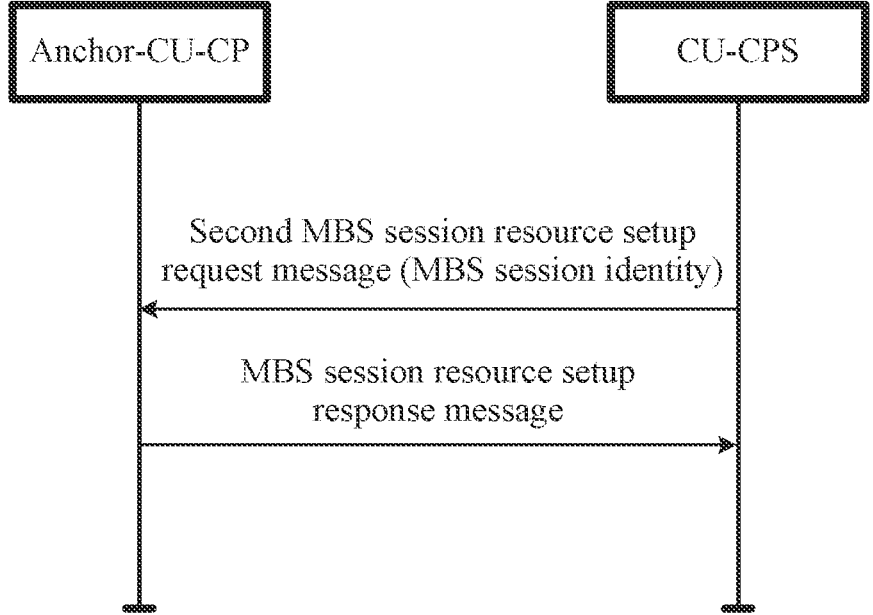
FIG. 3D is a schematic diagram of an MBS session resource setup request process according to an embodiment of the present application.

(2) FIG. 3D is a schematic diagram of an MBS session resource setup request process according to an embodiment of the present application. With reference to FIG. 3D, if the anchor-CU-CP is not the first CU-CP having an MBS service request, when the first CU-CP having an MBS service request needs to know the MBS data processing setup information, the first CU-CP having an MBS service request may send an applying message for generating the MBS data processing setup information, such as the second MBS session resource setup request message, to the anchor-CU-CP via an Xn interface according to the anchor-CU-CP indicated by the core network, and the applying message may carry an MBS session ID and MBS session information. The MBS session information includes one or more of an MBS session identity or session resource setup information, and the session resource setup information includes uplink NG user plane transport network information, a session type, a QoS flow identity, and a QoS parameter of a QoS flow level. After the anchor-CU-CP receives the applying message, the anchor-CU-CP generates the MBS data processing setup information according to the MBS session ID and the MBS session information in the applying message. The MBS data processing setup information may include one or more of the following: an MBS session identity, the MBS session downlink aggregation maximum bit rate, NG uplink user plane transport layer information, or MRB list information required for each MBS session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB. After the anchor-CU-CP replies with an acknowledgement response in a response message, such as an MBS session resource setup response message, and carries the generated MBS data processing setup information in the response message. In addition, the anchor-CU-CP further needs to send the generated MBS data processing setup information to the common-CU-UP via an E1 interface. When the remaining other CU-CPs have the MBS service requirements, these CU-CPs only need to directly apply to the anchor-CU-CP via the Xn interface in the same manner as shown in FIG. 3C.

In addition, in the present embodiment, when the anchor-CU-CP changes or releases the MBS data processing setup information, the anchor-CU-CP notifies other CU-CPs of a change indication and change content via the Xn interface. The anchor-CU-CP may further notify the common-CU-UP of the change indication and change content via the E1 interface.

Anchor-CU-CP change: the AMF notifies multiple CU-CPs of a new anchor-CU-CP ID through an MBS session resource modification message via an NG-C interface.

MBS data processing setup information change: only the anchor-CU-CP can change the MBS data processing setup information. After the MBS data processing setup information is changed, only the anchor-CU-CP can send the new setup to the CU-UP via the E1 interface and to other CU-CPs via the Xn interface.

Embodiment Two: Scheme Based on an Autonomously Negotiated Anchor-CU-CP

How the core network determines an anchor-CU-CP needs to be considered first.

In the present scheme, no anchor-CU-CP is designated by the core network. In this case, the first CU-CP having MBS multicast service established requirements is considered to be the anchor-CU-CP, and the anchor-CU-CP directly generates the MBS control information (which is subsequently referred to as the MBS data processing setup information and is sent to the common-CU-UP). The MBS data processing setup information may include one or more of the following: an MBS session identity, the MBS session downlink aggregation maximum bit rate, NG uplink user plane transport layer information, or MRB list information required for each MBS session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB.

After the anchor-CU-CP is determined, how other CU-CPs acquire the MBS data processing setup information is described below. In the present embodiment, other CU-CPs do not know which is the anchor-CU-CP. Therefore, other CU-CPs may acquire the MBS data processing setup information in the following several manners.

(1) Scheme One: Xn-Based Broadcast Manner

Figure 3E:
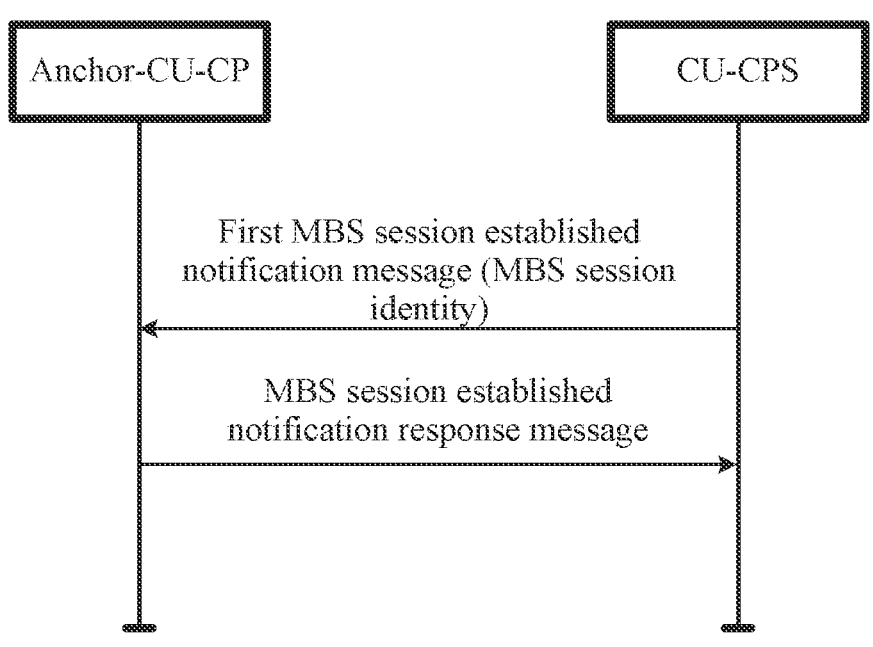
FIG. 3E is a schematic diagram of a process of indicating MBS control information based on a broadcast manner according to an embodiment of the present application.

FIG. 3E is a schematic diagram of a process of indicating MBS control information based on a broadcast manner according to an embodiment of the present application. As shown in FIG. 3E, the anchor-CU-CP as the first having the MBS multicast service established requirements directly generates MB S data processing setup information and sends the MBS data processing setup information to the common-CU-UP. At the same time, the anchor-CU-CP broadcasts the MBS data processing setup information to CU-CPs (having an Xn connection) of other RAN nodes within the area via the Xn interface. In this manner, other CU-CPs that are non-anchor-CU-CPs acquire the MBS data processing setup information sent by the anchor-CU-CP to the common-CU-UP. The manner is described below.

The anchor-CU-CP sends the MBS data processing setup information to the other CU-CPs through a first MBS session established notification message (that is, an MBS session established notification message) via the Xn interface. The first MBS session established notification message includes one or more of the following: an MBS session identity, the MBS session downlink aggregation maximum bit rate, NG uplink user plane transport layer information, or MRB list information required for each MBS session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB. After receiving the MBS data processing setup information, the other CU-CPs reply to the anchor-CU-CP with an acknowledgement message.

Anchor-CU-CP change: the next anchor-CU-CP is designated by the original anchor-CU-CP.

MBS data processing setup information change: only the anchor-CU-CP can change the MBS data processing setup information. After the MBS data processing setup information is changed, only the anchor-CU-CP can send the new setup to the CU-UP via the E1 interface and to other CU-CPs via the Xn interface.

(2) Scheme Two: E1 Interface-Based Query Manner from the Common-CU-UP

The anchor-CU-CP as the first having MBS multicast service established requirements directly generates MB S data processing setup information and sends the MBS data processing setup information to the common-CU-UP. If other CU-CPs also have the MBS service established requirements, other CU-CPs request the MRB configuration information of the established MBS from the common-CU-UP via the E1 interface. The common-CU-UP replies with the information about the established MBS via the E1 interface. The manner is described below.

Figure 3F:
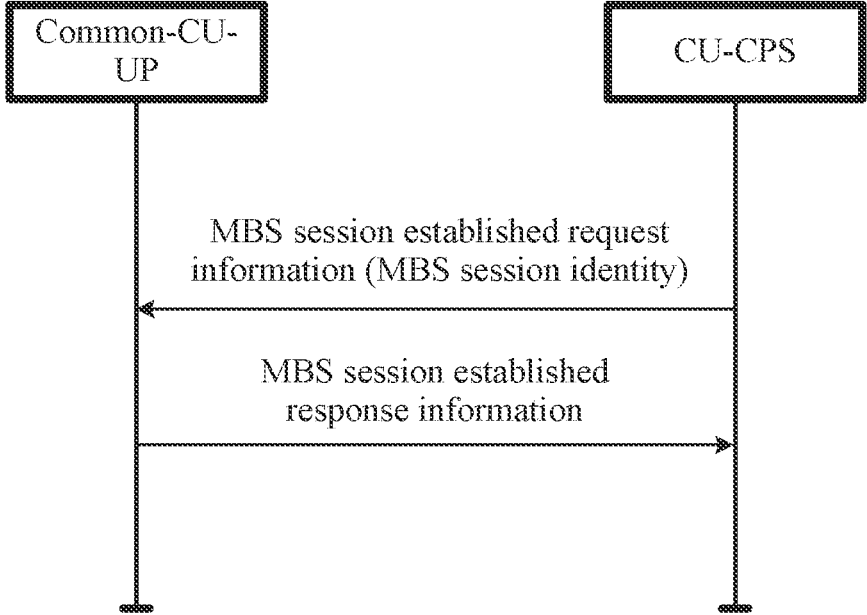
FIG. 3F is a schematic diagram of a process of querying MBS control information based on E1 according to an embodiment of the present application.

FIG. 3F is a schematic diagram of a process of querying MBS control information based on E1 according to an embodiment of the present application. As shown in FIG. 3F, a CU-CP having MBS service established requirements sends MBS session established request information (that is, an MBS session established request message) via the E1 interface to the common-CU-UP for requesting the MBS data processing setup information of a corresponding MBS session. The MBS session established request information may include an MBS session ID. After receiving the request message, the queried common-CU-UP replies to the querying CU-CP with MBS session established response information. The MBS session established response information includes the MBS data processing setup information of the corresponding MBS session. The MBS data processing setup information includes one or more of the following: an MBS session identity, the MBS session downlink aggregation maximum bit rate, NG uplink user plane transport layer information, or MRB list information required for each MBS session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB.

In addition, in the present embodiment, when the anchor-CU-CP changes or releases the MBS data processing setup information, the anchor-CU-CP notifies the common-CU-UP via the E1 interface, and the common-CU-UP notifies other CU-CPs of a change indication and change content via the E1 interface.

Anchor-CU-CP change: when the original anchor-CU-CP leaves, the original anchor-CU-CP sends a release indication to the common-CU-UP. The common-CU-UP decides a next anchor-CU-CP and instructs the next anchor-CU-CP to be the anchor-CU-CP via the E1. Only the anchor-CU-CP can change the MBS data processing setup information. After the MBS data processing setup information is changed, only the anchor-CU-CP can send the new setup to the CU-UP via the E1 interface and to other CU-CPs via the Xn.

Any CU-CP initiates an MBS data processing setup information change request to the common-CU-UP, and the common-CU-UP receives the new setup and sends the new setup to other CU-CPs.

(3) Scheme Three: Xn-Based Query Manner

The anchor-CU-CP as the first having MBS multicast service established requirements directly generates the MBS data processing setup information and sends the MBS data processing setup information to the common-CU-UP. If other CU-CPs also have the MBS service established requirements, any CU-CP (because at this point, multiple CU-CPs do not know the anchor-CU-CP) queries via the Xn interface whether the MBS data processing setup information of the corresponding established MBS session. If a queried CU-CP has the MBS data processing setup information, the CU-CP sends the MBS data processing setup information of the corresponding established MBS session to the querying CU-CP. If the queried CU-CP does not have the MBS data processing setup information, the CU-CP replies that it has no MBS data processing setup information. The CU-CP having the MBS service established requirements then notifies the Xn interface to query a next CU-CP until the CU-CP acquires the MBS data processing setup information of the corresponding MBS session. The manner is described below.

Figure 3G:
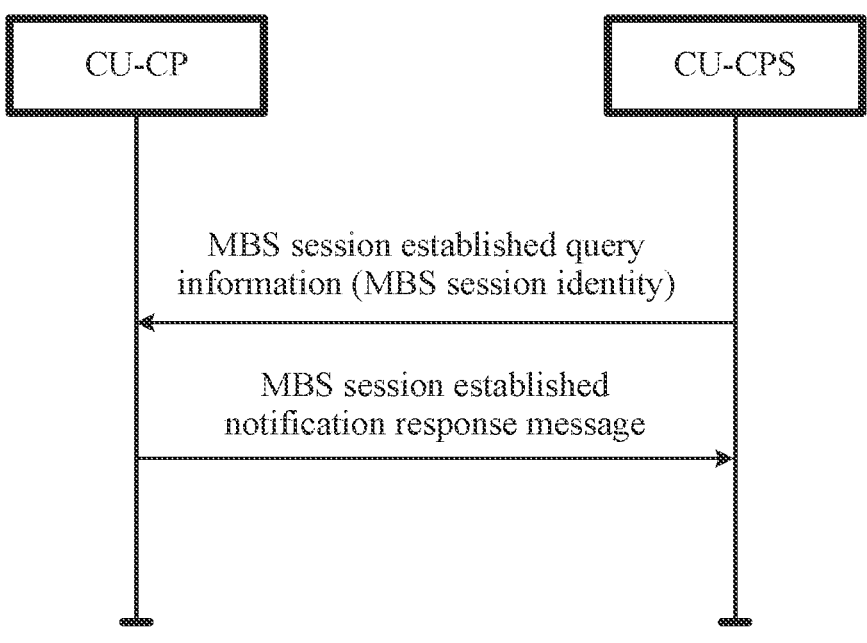
FIG. 3G is a schematic diagram of a process of querying MBS control information based on Xn according to an embodiment of the present application.

FIG. 3G is a schematic diagram of a process of querying MBS control information based on Xn according to an embodiment of the present application. As shown in FIG. 3G, the CU-CP having MBS service established requirements sends MBS session established query information via the Xn interface to query any CU-CP whether the CU-CP has the MBS data processing setup information of the corresponding MBS session. The MBS session established query information may include an MBS session ID. After a queried CU-CP receives the query message, the queried CU-CP replies to the querying CU-CP with an MBS session established notification response message according to its actual situation. If the queried CU-CP has the MBS data processing setup information, the MBS session established notification response message includes the MBS data processing setup information of the corresponding MBS session. The content of the MBS data processing setup information includes one or more of the following: an MBS session identity, the MBS session downlink aggregation maximum bit rate, NG uplink user plane transport layer information, or MRB list information required for each MB S session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB. If the queried CU-CP does not have the MBS data processing setup information, the CU-CP replies that it has no MBS data processing setup information in the message.

If one CU-CP queries all CPs that none of the CPs has the MBS data processing setup information of the established MBS session, the CU-CP generates the MBS data processing setup information itself and sends the MBS data processing setup information to the common-CU-UP. Other CU-CPs query other CPs via the Xn interface in the same manner until the MBS data processing setup information is acquired.

Embodiment Three: Template-Based/Default Common-CU-UP Configuration Scheme

In the schemes of embodiment one and embodiment two described above, the configuration of the common-CU-UP is generated by the anchor-CU-CP. Multiple CU-CPs need to perform a message interaction via the Xn or E1 interface to acquire the configuration information of the common-CU-UP.

In the present embodiment, since no anchor-CU-CP exists, that is, all CU-CPs are equal, the configuration of the common-CU-UP is configured by the background or is generated by the core network. The manner is described below.

(1) Scheme One: The Configuration of the Common-CU-UP Generated by the Background In the scheme, the background network management such as the operation administration and maintenance (OAM) generates the MB S data processing setup information of the common-CU-UP and configures the MBS data processing setup information to the common-CU-UP and all CU-CPs (RAN nodes having the Xn connection within the area). The content of the MBS data processing setup information includes one or more of the following: an MBS session identity, the MBS session downlink aggregation maximum bit rate, NG uplink user plane transport layer information, or MRB list information required for each MBS session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB.

Figure 3H:
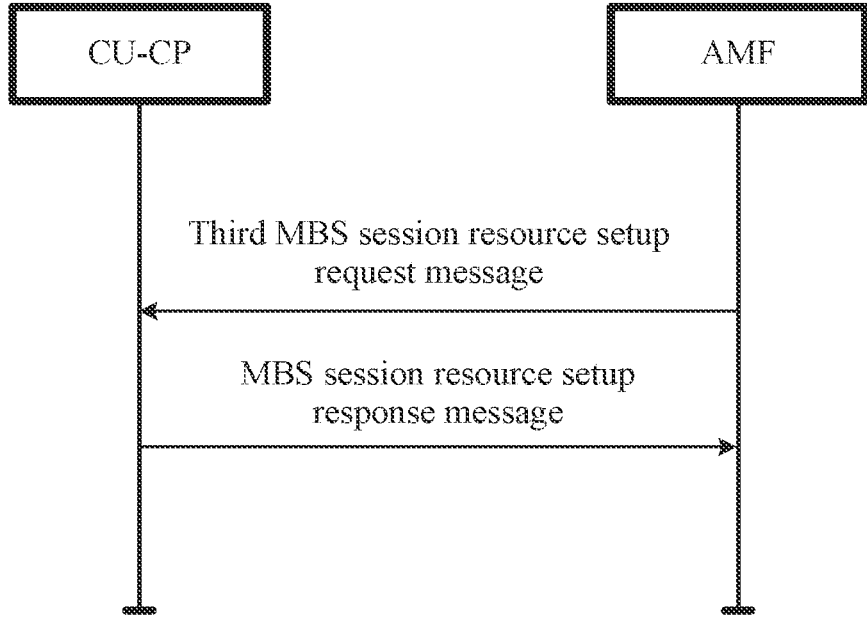
FIG. 3H is a schematic diagram of an MBS session resource setup process according to an embodiment of the present application.

(2) Scheme Two: The Configuration of the Common-CU-UP Generated by the Core Network FIG. 3H is a schematic diagram of an MBS session resource setup process according to an embodiment of the present application. As shown in FIG. 3H, in the scheme, when the core network initiates a third MBS session resource setup request message to any CU-CP having MBS service requirements, the MB S data processing setup information may be included in the third MBS session resource setup request message. The MBS data processing setup information includes one or more of the following: an MBS session identity, the MBS session downlink aggregation maximum bit rate, NG uplink user plane transport layer information, or MRB list information required for each MBS session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB. For the same MBS service, the core network sends the same MBS data processing setup information to all CU-CPs.

For example, when the core network sends a fourth MBS session resource setup request message to a CU-CP, MBS session information and MBS data processing setup template information (that is, template information) may be included in the message. For example, the template information includes setup rule list information about QoS flow list identity-to-MRB identity mapping, each set of setup rules includes one or more of the following: an MRB identity, an SDAP configuration, or a PDCP configuration, the SDAP configuration includes one or more of the following: an SDAP header, a default MRB, or a mapped QoS flow list, and the PDCP configuration includes one or more of the following: a PDCP sequence number length, an out-of-order delivery indication, or a discard timer. After the CU-CP receives the fourth MBS session resource setup request message, the CU-CP matches a matching MRB template according to the QoS flow information included in the MBS session information and the MBS data processing configuration template information and configures and generates the MB S data processing setup information. The content of the MBS data processing setup information includes one or more of the following: an MBS session identity, the MBS session downlink aggregation maximum bit rate, NG uplink user plane transport layer information, or MRB list information required for each MBS session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB.

Multiple CU-CPs send an MRB context setup request message (that is, an MBS context setup request message) to the common-CU-UP via the E1 interface. The MRB context setup request message includes the MBS data processing setup information sent by the core network to the multiple CU-CPs. In this case, the common-CU-UP receives the same MBS data processing setup information from the multiple CU-CPs, and only common MRB context needs to be established.

In addition, in the present embodiment, when the core network changes or releases the MBS data processing setup information or the template information, the core network notifies the multiple CU-CPs via an Ng interface, and the multiple CU-CPs notify the common-CU-UP via the E1 interface. When the background changes or releases the MBS data processing setup information, the background directly notifies the common-CU-UP and the multiple CU-CPs.

The core network may autonomously change the MBS data processing setup information and notify all CU-CPs and the common-CU-UP. Over the Ng interface, the core network sends an MBS session established/modification request message to a CP, and the MBS session established/modification request message includes the MBS data processing setup information.

Figure 5:
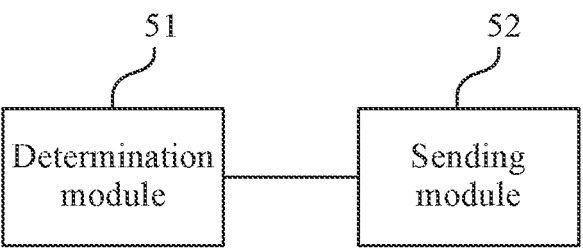
FIG. 5 is a structure schematic diagram of a processing apparatus according to an embodiment of the present application.

In an example implementation, the present application provides a processing apparatus. FIG. 5 is a structure schematic diagram of a processing apparatus according to an embodiment of the present application. The processing apparatus may be integrated into a first network node and includes a determination module 51 and a sending module 52. The determination module 51 is configured to determine MBS control information, and the sending module 52 is configured to send the MBS control information, where the MBS control information instructs a second network node to process an MBS data packet.

The processing apparatus provided in the embodiment is configured to perform the processing method in the embodiment shown in FIG. 1. The implementation principles and effects of the processing apparatus provided in the embodiment are similar to those of the processing method in the embodiment shown in FIG. 1, and the details are not repeated here.

Based on the preceding embodiments, variant embodiments of the preceding embodiments are provided. It is to be noted here that for ease of description, only differences from the preceding embodiments are described in the variant embodiments.

In an embodiment, the determination module 51 is configured to acquire a first MBS session resource setup request message sent by a third network node, where the first MBS session resource setup request message includes area information or node identity information of the first network node; and the determination module 51 is configured to generate the MBS control information directly according to the first MBS session resource setup request message, the area information includes one network node, or a cell list, or one area code, and the area code corresponds to one network node list or one cell list.

In an embodiment, the processing apparatus further includes a first acquisition module.

The first acquisition module is configured to acquire an MBS session resource information request sent by a fourth network node, where the MBS session resource information request includes an MBS session identity or MBS session information; and the first acquisition module is configured to send an MBS session resource information response message to the fourth network node, where the MBS session resource information response message includes the MBS control information.

The MBS session information includes one or more of an MBS session identity or session resource setup information, and the session resource setup information includes uplink NG user plane transport network information, a session type, a QoS flow identity, or a QoS parameter of a QoS flow level.

In an embodiment, the determination module 52 is configured to acquire a second MBS session resource setup request message sent by the fourth network node and generate the MBS control information according to the second MBS session resource setup request message.

The second MBS session resource setup request message is a message sent by a network node as the first having an MBS service request and requesting for the MBS control information, and the second MBS session resource setup request message includes an MBS session identity or MBS session information.

In an embodiment, the processing apparatus further includes a feedback module.

The feedback module is configured to feed back an MBS session resource setup response message to the fourth network node, where the MBS session resource setup response message includes the MBS control information.

In an embodiment, the determination module 51 is configured to directly generate the MBS control information.

In an embodiment, the processing apparatus further includes a first sending module.

The first sending module is configured to send a first MBS session established notification message to the fourth network node, where the first MBS session established notification message includes the MBS control information.

In an embodiment, the processing apparatus further includes a second acquisition module.

The second acquisition module is configured to acquire first MBS session established query information sent by the fourth network node, where the first MBS session established query information includes an MBS session identity; and the second acquisition module is configured to send a first MBS session established notification response message to the fourth network node, where the first MBS session established notification response message includes the MBS control information.

In an embodiment, the determination module 51 is configured to acquire a third MBS session resource setup request message sent by the third network node, where the third MBS session resource setup request message includes the MBS control information; or the determination module 51 is configured to acquire a fourth MBS session resource setup request message sent by the third network node, and generate the MBS control information according to the fourth MBS session resource setup request information, where the fourth MBS session resource setup request message includes MBS session information and template information of the MBS control information, the template information includes setup rule list information about QoS flow list identity-to-MRB identity mapping, each set of setup rules includes one or more of the following: an MRB identity, an SDAP configuration, or a PDCP configuration, the SDAP configuration includes one or more of the following: an SDAP header, a default MRB, or a mapped QoS flow list, and the PDCP configuration includes one or more of the following: a PDCP sequence number length, an out-of-order delivery indication, or a discard timer.

In an embodiment, the processing apparatus further includes a third acquisition module.

The third acquisition module is configured to acquire an MBS session resource change message, where the MBS session resource change message includes node identity information of a new first network node.

In an embodiment, the processing apparatus further includes a second sending module.

The second sending module is configured to send changed MBS control information.

In an embodiment, the processing apparatus further includes a transmission module.

The transmission module is configured to transmit anchor change information, where the anchor change information includes node identity information of a new first network node.

In an embodiment, the processing apparatus further includes a fourth acquisition module.

The fourth acquisition module is configured to acquire changed MBS control information.

In an embodiment, the processing apparatus further includes a third sending module.

The third sending module is configured to send release information to the second network node.

In an embodiment, the processing apparatus further includes a fourth sending module.

The fourth sending module is configured to send change request information to the second network node, where the change request information requests to change the MBS control information.

In an embodiment, the MBS control information includes one or more of the following: an MBS session identity, the MBS session downlink aggregation maximum bit rate, NG uplink user plane transport layer information, or MRB list information required for each MBS session and established by the second network node. Each piece of MRB list information includes one or more of the following: an MRB identity, an SDAP configuration, a PDCP configuration, QoS parameter information, a QoS flow list included in an MRB, a QoS flow identity included in an MRB, or QoS parameter information of a QoS flow level included in an MRB.

Figure 6:
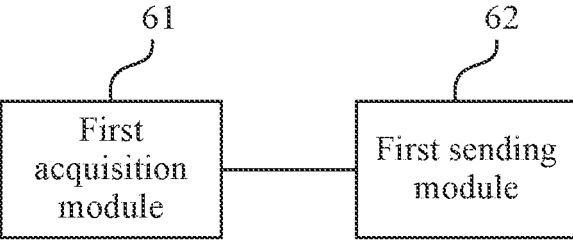
FIG. 6 is a structure schematic diagram of another processing apparatus according to an embodiment of the present application.

In an example implementation, an embodiment of the present application further provides a processing apparatus. FIG. 6 is a structure schematic diagram of another processing apparatus according to an embodiment of the present application. The processing apparatus may be integrated into a fourth network node. As shown in FIG. 6, the processing apparatus includes a first acquisition module 61 and a first sending module 62. The first acquisition module 61 is configured to acquire MBS control information. The first sending module 62 is configured to send the MBS control information.

The processing apparatus provided in the embodiment is configured to perform the processing method in the embodiment shown in FIG. 2. The implementation principles and effects of the processing apparatus provided in the embodiment are similar to those of the processing method in the embodiment shown in FIG. 2, and the details are not repeated here.

Based on the preceding embodiments, variant embodiments of the preceding embodiments are provided. It is to be noted here that for ease of description, only differences from the preceding embodiments are described in the variant embodiments.

In an embodiment, the first acquisition module is configured to acquire a first MBS session resource setup request message sent by a third network node, send an MBS session resource information request to a first network node, and acquire an MBS session resource information response message sent by the first network node.

In an embodiment, the first acquisition module is configured to acquire a first MBS session resource setup request message sent by a third network node, send a second MBS session resource setup request message to the first network node, and acquire an MBS session resource setup response message fed back by the first network node.

In an embodiment, the first acquisition module is configured to acquire a first MBS session established notification message sent by the first network node.

In an embodiment, the first acquisition module is configured to send first MBS session established query information and acquire a first MBS session established notification response message.

In an embodiment, the first acquisition module is configured to send second MBS session established query information and acquire a second MBS session established notification response message, where the second MBS session established notification response message is sent by another non-anchor network node and indicates whether the MBS control information exists.

In a case where the second MBS session established notification response message indicates that the MBS control information exists, the first MBS session established notification response message includes the MBS control information, and in a case where the second MBS session established notification response message indicates that the MBS control information does not exist, it is continued to send the second MBS session established query information.

In an embodiment, the processing apparatus further includes a second acquisition module. The second acquisition module is configured to acquire MBS session established query information sent by another non-anchor network node, and feed back a third MBS session established notification response message, where the third MBS session established notification response message indicates whether the MBS control information exists in the current network node.

In an embodiment, the first acquisition module is configured to acquire a third MBS session resource setup request message sent by the third network node.

In an embodiment, the first acquisition module is configured to send MBS session established request information to the second network node, where the MBS session established request information includes an MBS session identity; and the first acquisition module is configured to acquire an MBS session established response information sent by the second network node, where the MBS session established response information includes the MBS control information.

In an embodiment, the processing apparatus further includes a second sending module.

The second sending module is configured to send change request information to the second network node.

In an embodiment, the processing apparatus further includes a third acquisition module.

The third acquisition module is configured to acquire changed MBS control information.

Figure 7:
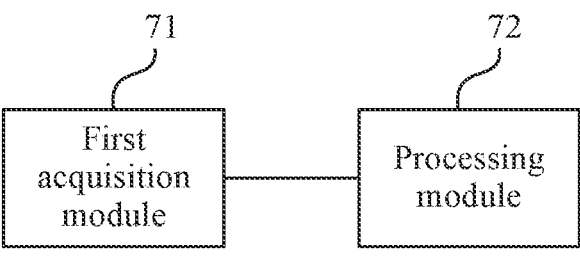
FIG. 7 is a structure schematic diagram of another processing apparatus according to an embodiment of the present application.

In an example implementation, an embodiment of the present application further provides a processing apparatus. FIG. 7 is a structure schematic diagram of another processing apparatus according to an embodiment of the present application. The processing apparatus may be integrated into a second network node. As shown in FIG. 7, the processing apparatus includes a first acquisition module 71 and a processing module 72. The first acquisition module 71 is configured to acquire MBS control information. The processing module 72 is configured to process an MBS data packet based on the MBS control information.

The processing apparatus provided in the embodiment is configured to perform the processing method in the embodiment shown in FIG. 3. The implementation principles and effects of the processing apparatus provided in the embodiment are similar to those of the processing method in the embodiment shown in FIG. 3, and the details are not repeated here.

Based on the preceding embodiments, variant embodiments of the preceding embodiments are provided. It is to be noted here that for ease of description, only differences from the preceding embodiments are described in the variant embodiments.

In an embodiment, the processing apparatus further includes a sending module.

The sending module is configured to acquire MBS session established request information sent by a fourth network node and send MBS session established response information to the fourth network node.

In an embodiment, the processing apparatus further includes a transmission module.

The transmission module is configured to acquire release information sent by a first network node and determine and transmit node identity information of a new first network node.

In an embodiment, the processing apparatus further includes a second acquisition module.

The second acquisition module is configured to acquire changed MBS control information.

In an embodiment, the processing apparatus further includes a third acquisition module.

The third acquisition module is configured to acquire change request information and transmit the changed MBS control information.

Figure 8:
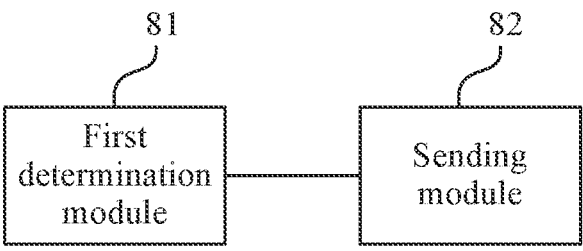
FIG. 8 is a structure schematic diagram of another processing apparatus according to an embodiment of the present application.

In an example implementation, an embodiment of the present application further provides a processing apparatus. FIG. 8 is a structure schematic diagram of another processing apparatus according to an embodiment of the present application. The processing apparatus may be integrated into a third network node. As shown in FIG. 8, the processing apparatus includes a first determination module 81 and a sending module 82. The first determination module 81 is configured to determine an MBS session resource setup request message. The sending module 82 is configured to send the MBS session resource setup request message.

The processing apparatus provided in the embodiment is configured to perform the processing method in the embodiment shown in FIG. 4. The implementation principles and effects of the processing apparatus provided in the embodiment are similar to those of the processing method in the embodiment shown in FIG. 4, and the details are not repeated here.

Based on the preceding embodiments, variant embodiments of the preceding embodiments are provided. It is to be noted here that for ease of description, only differences from the preceding embodiments are described in the variant embodiments.

In an embodiment, the MBS session resource setup request message includes a first MBS session resource setup request message or a third MBS session resource setup request message.

In an embodiment, the processing apparatus further includes a second determination module.

The second determination module is configured to determine and transmit an MBS session resource change message.

In an embodiment, the processing apparatus further includes a third determination module.

The third determination module is configured to determine and transmit changed MBS control information.

Figure 9:
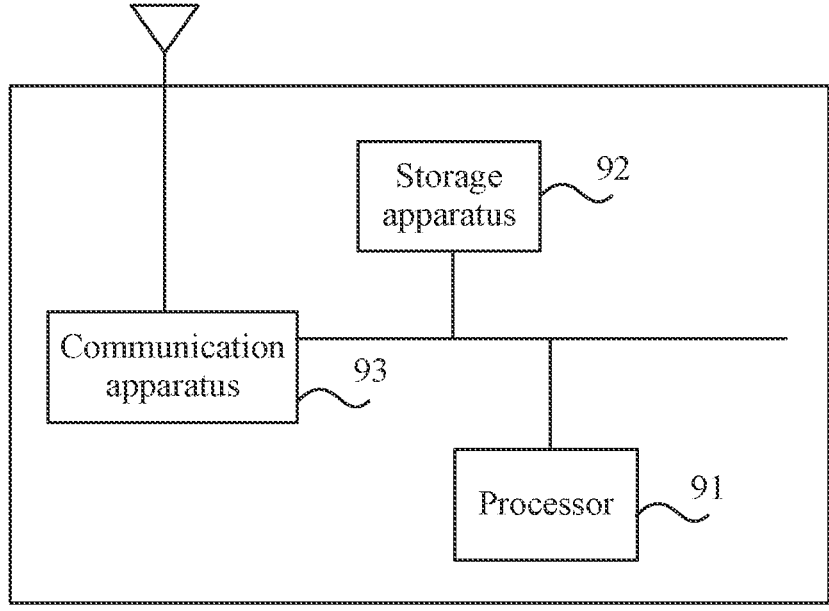
FIG. 9 is a structure diagram of a network node according to an embodiment of the present application.

In an example implementation, an embodiment of the present application further provides a network node. FIG. 9 is a structure diagram of a network node according to an embodiment of the present application. As shown in FIG. 9, the network node provided in the present application includes one or more processors 91 and a storage apparatus 92. One or more processors 91 are provided in the network node, and one processor 91 is shown as an example in FIG. 9. The storage apparatus 92 is configured to store one or more programs, and the one or more programs are executed by the one or more processors 91 to enable the one or more processors 91 to implement the processing method in the embodiments of the present application. The network node in the embodiment may be one or more of the first network node, the second network node, the third network node or the fourth network node.

The network node further includes a communication apparatus 93.

The processor 91, the storage apparatus 92 and the communication apparatus 93 in the network node are connected via a bus or in other manners, and the connection via a bus is shown as an example in FIG. 9.

The communication apparatus 93 may include a receiver and a sender. The communication apparatus 93 is configured to perform information transceiving and communication under the control of the processor 91.

As a computer-readable storage medium, the storage apparatus 92 may be configured to store software programs, computer-executable programs and modules such as program instructions/modules (for example, the determination module 51 and the sending module 52 in the processing apparatus; the first acquisition module 61 and the first sending module 62 in the processing apparatus; the first acquisition module 71 and the processing module 72 in the processing apparatus; or the first determination module 81 and the sending module 82 in the processing apparatus) corresponding to the processing method in the embodiments of the present application. The storage apparatus 92 may include a program storage region and a data storage region. The program storage region may store an operating system and an application program required by at least one function. The data storage region may store data created depending on the use of a device. Additionally, the storage apparatus 92 may include a high-speed random-access memory and may also include a non-volatile memory such as at least one disk memory, a flash memory device or another non-volatile solid-state memory. In some examples, the storage apparatus 92 may include memories which are remotely disposed with respect to the processor 91. These remote memories may be connected to the network node via a network. Examples of the preceding network include, but are not limited to, the Internet, an intranet, a local area network, a mobile communication network, and combinations thereof.

An embodiment of the present application further provides a storage medium. The storage medium is configured to store a computer program, and the computer program, when executed by a processor, implements any method in the present application. The storage medium is configured to store a computer program, and the computer program, when executed by a processor, implements any processing method in the embodiments of the present application. For example, the processing method applied to the first network node is implemented. The method includes the following:

MBS control information is determined.

The MBS control information is sent, where the MBS control information instructs a second network node to process an MBS data packet.

For another example, the processing method applied to the fourth network node is implemented. The method includes the following:

The MBS control information is acquired.

The MBS control information is sent.

For another example, the processing method applied to the second network node is implemented. The method includes the following:

MBS control information is acquired.

An MBS data packet is processed based on the MBS control information.

For another example, the processing method applied to the third network node is implemented. The method includes that an MBS session resource setup request message is determined and sent.

A computer storage medium in the embodiments of the present application may adopt any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or element, or any combination thereof. Specific examples (non-exhaustive list) of the computer-readable storage medium include an electrical connection having one or more wires, a portable computer magnetic disk, a hard disk, a random access memory (RAM), a read only memory (ROM), an erasable programmable read only memory (EPROM), a flash memory, an optical fiber, a portable compact disc read only memory (CD-ROM), an optical memory device, a magnetic memory device, or any suitable combination thereof. The computer-readable storage medium may be any tangible medium that may contain, or store a program for use by or in connection with an instruction execution system, apparatus, or device.

The computer-readable signal medium may include a propagated data signal with computer-readable program codes embodied therein, for example, in a baseband or as a part of a carrier wave. Such a propagated signal may take any of a variety of forms, including, but not limited to, electro-magnetic, optical, or any suitable combination thereof. The computer-readable signal medium may be any computer-readable medium that is not a computer-readable storage medium and that can communicate, propagate, or transport a program for use by or in connection with an instruction execution system, apparatus, or device.

The program codes included on the computer-readable medium may be transmitted via any suitable medium which includes, but is not limited to, a wire, an optical cable, a radio frequency (RF), or any suitable combination thereof.

Computer program codes for performing operations of the present application may be written in one or more programming languages or combinations thereof. The programming languages include object-oriented programming languages such as Java, Smalltalk, and C++, and further include conventional procedural programming languages such as C language or similar programming languages. The program codes may be executed entirely on a user computer, partly on a user computer, as a stand-alone software package, partly on a user computer and partly on a remote computer, or entirely on a remote computer or a server. In the case relating to a remote computer, the remote computer may be connected to a user computer through any type of network, including a local area network (LAN) or a wide area network (WAN), or the connection may be made to an external computer (for example, through the Internet using an Internet service provider).

The preceding are example embodiments of the present application and are not intended to limit the scope of the present application.

In general, the various embodiments of the present application may be implemented in hardware or special-purpose circuits, software, logic or any combination thereof. For example, some aspects may be implemented in hardware while other aspects may be implemented in firmware or software that may be executed by a controller, a microprocessor, or other computing apparatuses, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination thereof. Computer programs may be stored in the memory. The memory may be of any type suitable for a local technical environment and may be implemented using any suitable data storage technology such as, but not limited to, a read-only memory (ROM), a random access memory (RAM) or an optical memory apparatus and system (a digital video disc (DVD) or a compact disk (CD)). The computer-readable medium may include a non-transitory storage medium. The data processor may be of any type suitable to the local technical environment, and for example, includes, but is not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

The detailed description of example embodiments of the present application has been provided above through exemplary and non-restrictive examples. However, considering the drawings and the claims, various modifications and adjustments to the preceding embodiments are apparent to those skilled in the art without departing from the scope of the present application. Accordingly, the proper scope of the present application is determined according to the claims.

What is claimed is:

1. A processing method, being applied to a first network node and comprising:
  determining multicast broadcast service (MBS) control information; and
  sending the MBS control information to a second network node, wherein the MBS control information instructs the second network node to process an MBS data packet;
  wherein after determining the MBS control information, sending the MBS control information to a fourth network node in one of following manners:
  sending, according to an MBS session resource information request sent by the fourth network node, an MBS session resource information response message containing the MBS control information to the fourth network node;
  feeding back an MBS session resource setup response message containing the MBS control information to the fourth network node;
  sending a first MBS session established notification message containing the MBS control information to the fourth network node; or
  sending a first MBS session established notification response message containing the MBS control information to the fourth network node;
  wherein the first network node comprises an anchor-centralized unit-control plane (anchor-CU-CP), the anchor-CU-CP is designated by a core network or autonomously negotiated, the fourth network node comprises at least one non-anchor-CU-CP, and the second network node is a centralized unit-user plane (CU-UP) corresponding to the first network node and the fourth network node.

2. The method of claim 1, wherein determining the MBS control information comprises:
  acquiring a first MBS session resource setup request message sent by a third network node; and
  generating the MBS control information directly according to the first MBS session resource setup request message;
  wherein the first MBS session resource setup request message comprises area information or node identity information of the first network node, wherein the area information comprises one of: one network node, a cell list, or one area code, and the area code corresponds to one network node list or one cell list;
  wherein the third network node is the core network.

3. The method of claim 2, wherein sending, according to the MBS session resource information request sent by the fourth network node, the MBS session resource information response message containing the MBS control information to the fourth network node comprises:
  acquiring the MBS session resource information request sent by the fourth network node, wherein the MBS session resource information request comprises an MBS session identity or MBS session information; and
  sending the MBS session resource information response message to the fourth network node;
  wherein the MBS session information comprises at least one of: an MBS session identity or session resource setup information, and the session resource setup information comprises uplink next-generation (NG) user plane transport network information, a session type, a quality of service (QoS) flow identity, or a QoS parameter of a QoS flow level.

4. The method of claim 1, wherein determining the MBS control information comprises:

acquiring a second MBS session resource setup request message sent by the fourth network node; and generating the MBS control information according to the second MBS session resource setup request message;

wherein the second MBS session resource setup request message comprises an MBS session identity or MBS session information.

5. The method of claim 1, wherein determining the MBS control information comprises:

generating the MBS control information directly;

wherein sending the first MBS session established notification response message containing the MBS control information to the fourth network node comprises:

acquiring first MBS session established query information sent by the fourth network node, wherein the first MBS session established query information comprises an MBS session identity; and sending the first MBS session established notification response message to the fourth network node.

6. The method of claim 1, wherein determining the MBS control information comprises:

acquiring a third MBS session resource setup request message sent by a third network node, wherein the third MBS session resource setup request message comprises the MBS control information; or acquiring a fourth MBS session resource setup request message sent by a third network node, and generating the MBS control information according to the fourth MBS session resource setup request message, wherein the fourth MBS session resource setup request message comprises MBS session information and template information of the MBS control information, the template information comprises setup rule list information about QoS flow list identity-to-MBS radio bearer (MRB) identity mapping, a setup rule comprises at least one of the following: an MRB identity, a service data adaptation protocol (SDAP) configuration, or a packet data convergence protocol (PDCP) configuration, the SDAP configuration comprises at least one of the following: an SDAP header, a default MRB, or a mapped QoS flow list, and the PDCP configuration comprises at least one of the following: a PDCP sequence number length, an out-of-order delivery indication, or a discard timer.

7. The method of claim 1, further comprising at least one of the following:

acquiring an MBS session resource change message, wherein the MBS session resource change message comprises node identity information of a new first network node;

sending changed MBS control information;

transmitting anchor change information, wherein the anchor change information comprises node identity information of a new first network node;

acquiring changed MBS control information;

sending release information to the second network node; or sending change request information to the second network node, wherein the change request information requests for changing the MBS control information.

8. The method of claim 1, wherein the MBS control information comprises at least one of the following: an MBS session identity, an MBS session downlink aggregation maximum bit rate, NG uplink user plane transport layer information, or MRB list information required for an MBS session and established by the second network node, wherein the MRB list information comprises at least one of the following: an MRB identity, an SDAP configuration, a PDCP configuration, QoS parameter information, a QoS flow list contained in an MRB, a QoS flow identity contained in an MRB, or QoS parameter information of a QoS flow level contained in an MRB.

9. A non-transitory storage medium storing a computer program, wherein the computer program, when executed by a processor, implements the method of claim 1.

10. A processing method, being applied to a fourth network node and comprising:

acquiring multicast broadcast service (MBS) control information from one of a first network node, a second network node, or a third network node; and sending the MBS control information;

wherein acquiring the MBS control information from the first network node comprises one of:

acquiring, according to an MBS session resource information response message, the MBS control information, wherein the MBS session resource information response message comprises the MBS control information;

acquiring, according to an MBS session resource setup response message, the MBS control information, wherein the MBS session resource setup response message comprises the MBS control information;

acquiring, according to a first MBS session established notification message, the MBS control information, wherein the first MBS session established notification message comprises the MBS control information; or acquiring, according to a first MBS session established notification response message, the MBS control information, wherein the first MBS session established notification response message comprises the MBS control information;

wherein the first network node comprises an anchor-centralized unit-control plane (anchor-CU-CP), the anchor-CU-CP is designated by the third network node or autonomously negotiated, the fourth network node comprises at least one non-anchor-CU-CP, the second network node is a centralized unit-user plane (CU-UP) corresponding to the first network node and the fourth network node, and the third network node is a core network.

11. The method of claim 10, wherein acquiring the MBS control information from the second network node comprises:

sending MBS session established request information to the second network node, wherein the MBS session established request information comprises an MBS session identity; and acquiring an MBS session established response information sent by the second network node, wherein the MBS session established response information comprises the MBS control information.

12. The method of claim 10, wherein acquiring, according to the first MBS session established notification response message, the MBS control information comprises:

sending first MBS session established query information, and receiving the first MBS session established notification response message sent by the first network node.

13. A network node, comprising:

at least one processor; and a storage apparatus configured to store at least one program;

wherein the at least one program, when executed by the at least one processor, enables the at least one processor to implement the method of claim 10.

14. A non-transitory storage medium storing a computer program, wherein the computer program, when executed by a processor, implements the method of claim 10.

15. The method of claim 10, wherein acquiring, according to the MBS session resource setup response message fed back by the first network node, the MBS control information comprises:

acquiring a first MBS session resource setup request message sent by the third network node;

sending a second MBS session resource setup request message to the first network node; and receiving the MBS session resource setup response message.

16. The method of claim 10, wherein acquiring the MBS control information from the third network node comprises:

acquiring a third MBS session resource setup request message sent by the third network node, wherein the third MBS session resource setup request message comprises the MBS control information.

17. The method of claim 10, wherein acquiring, according to the MBS session resource information response message sent by the first network node, the MBS control information comprises:

acquiring a first MBS session resource setup request message sent by the third network node;

sending an MBS session resource information request to the first network node; and receiving the MBS session resource information response message;

wherein the MBS session resource information request comprises an MBS session identity or MBS session information, wherein the MBS session information comprises at least one of the following: an MBS session identity or session resource setup information, and the session resource setup information comprises uplink next-generation (NG) user plane transport network information, a session type, a quality of service (QoS) flow identity, or a QoS parameter of a QoS flow level.

18. The method of claim 10, wherein the MBS control information comprises at least one of the following: an MBS session identity, an MBS session downlink aggregation maximum bit rate, NG uplink user plane transport layer information, or MBS radio bearer (MRB) list information required for an MBS session and established by the second network node, wherein the MRB list information comprises at least one of the following: an MRB identity, a service data adaptation protocol (SDAP) configuration, a packet data convergence protocol (PDCP) configuration, QoS parameter information, a QoS flow list contained in an MRB, a QoS flow identity contained in an MRB, or QoS parameter information of a QoS flow level contained in an MRB.

19. A network node, comprising:

at least one processor; and a storage apparatus configured to store at least one program;

wherein the at least one program, when executed by the at least one processor, enables the at least one processor to implement:

determining multicast broadcast service (MBS) control information; and sending the MBS control information to a second network node, wherein the MBS control information instructs the second network node to process an MBS data packet;

wherein after determining the MBS control information, sending the MBS control information to a fourth network node in one of following manners:

sending, according to an MBS session resource information request sent by the fourth network node, an MBS session resource information response message containing the MBS control information to the fourth network node;

feeding back an MBS session resource setup response message containing the MBS control information to the fourth network node;

sending a first MBS session established notification message containing the MBS control information to the fourth network node; or sending a first MBS session established notification response message containing the MBS control information to the fourth network node;

wherein the network node comprises an anchor-centralized unit-control plane (anchor-CU-CP), the anchor-CU-CP is designated by a core network or autonomously negotiated, the fourth network node comprises at least one non-anchor-CU-CP, and the second network node is a centralized unit-user plane (CU-UP) corresponding to the network node and the fourth network node.

20. The network node of claim 19, wherein the at least one processor is enabled to implement determining the MBS control information by:

acquiring a first MBS session resource setup request message sent by a third network node; and generating the MBS control information directly according to the first MBS session resource setup request message;

wherein the first MBS session resource setup request message comprises area information or node identity information of the network node, wherein the area information comprises one of: one network node, a cell list, or one area code, and the area code corresponds to one network node list or one cell list; and the third network node is the core network.

* * * * *